US008942752B2

(12) United States Patent
Kim et al.

(10) Patent No.: US 8,942,752 B2
(45) Date of Patent: Jan. 27, 2015

(54) APPARATUS AND METHOD FOR CLUSTER BASED OPPORTUNISTIC POWER CONTROL IN WIRELESS COMMUNICATION SYSTEM

(75) Inventors: Dong In Kim, Suwon-si (KR); Hi-Chan Moon, Yongin-si (KR); Seong-Woo Ahn, Seongnam-si (KR); Jung-Su Han, Yongin-si (KR); Seung-Ah Chae, Suwon-si (KR); Mi-Seong Jin, Seongnam-si (KR)

(73) Assignees: Samsung Electronics Co., Ltd., Suwon-si (KR); Sungkyunkwan University Foundation for Corporate Collaboration, Suwon-si (KR)

( * ) Notice: Subject to any disclaimer, the term of this patent is extended or adjusted under 35 U.S.C. 154(b) by 499 days.

(21) Appl. No.: 13/289,427

(22) Filed: Nov. 4, 2011

(65) Prior Publication Data

US 2012/0115498 A1    May 10, 2012

(30) Foreign Application Priority Data

Nov. 8, 2010  (KR) .................. 10-2010-0110281

(51) Int. Cl.
| | |
|---|---|
| H04B 7/00 | (2006.01) |
| H04W 52/24 | (2009.01) |
| H04W 52/14 | (2009.01) |
| H04W 52/26 | (2009.01) |
| H04W 84/04 | (2009.01) |

(52) U.S. Cl.
CPC .......... *H04W 52/244* (2013.01); *H04W 52/146* (2013.01); *H04W 52/243* (2013.01); *H04W 52/265* (2013.01); *H04W 84/045* (2013.01)
USPC ........... 455/522; 455/63.2; 455/443; 455/450

(58) Field of Classification Search
CPC ............ H04W 84/045; H04W 52/244; H04W 72/082; H04W 16/10; H04W 16/30; H04W 36/04
USPC ......................................................... 455/522
See application file for complete search history.

(56) References Cited

U.S. PATENT DOCUMENTS

| | | | |
|---|---|---|---|
| 8,155,595 B2 * | 4/2012 | Sahin et al. .................. 455/63.2 |
| 2010/0226356 A1 * | 9/2010 | Sahin et al. .................. 370/342 |
| 2013/0130699 A1 * | 5/2013 | Xu et al. ....................... 455/443 |
| 2013/0260776 A1 * | 10/2013 | Whinnett ...................... 455/450 |

* cited by examiner

*Primary Examiner* — Ajibola Akinyemi
(74) *Attorney, Agent, or Firm* — Jefferson IP Law, LLP

(57) ABSTRACT

An apparatus and a method for a cluster-based power control at a macro base station in a wireless communication system are provided. The method includes broadcasting an interference allowance value determined based on a predefined aggregate interference to a femto cell, updating the interference allowance value with consideration of a channel activity for each femto cell group on a cluster basis, and when detecting a change in an aggregate interference generated due to femto cell power allocation, repeating determination of an interference allowance value so that a Quality of Service (QoS) of a macro cell user is met, and broadcasting the interference allowance value to a femto cell.

24 Claims, 15 Drawing Sheets

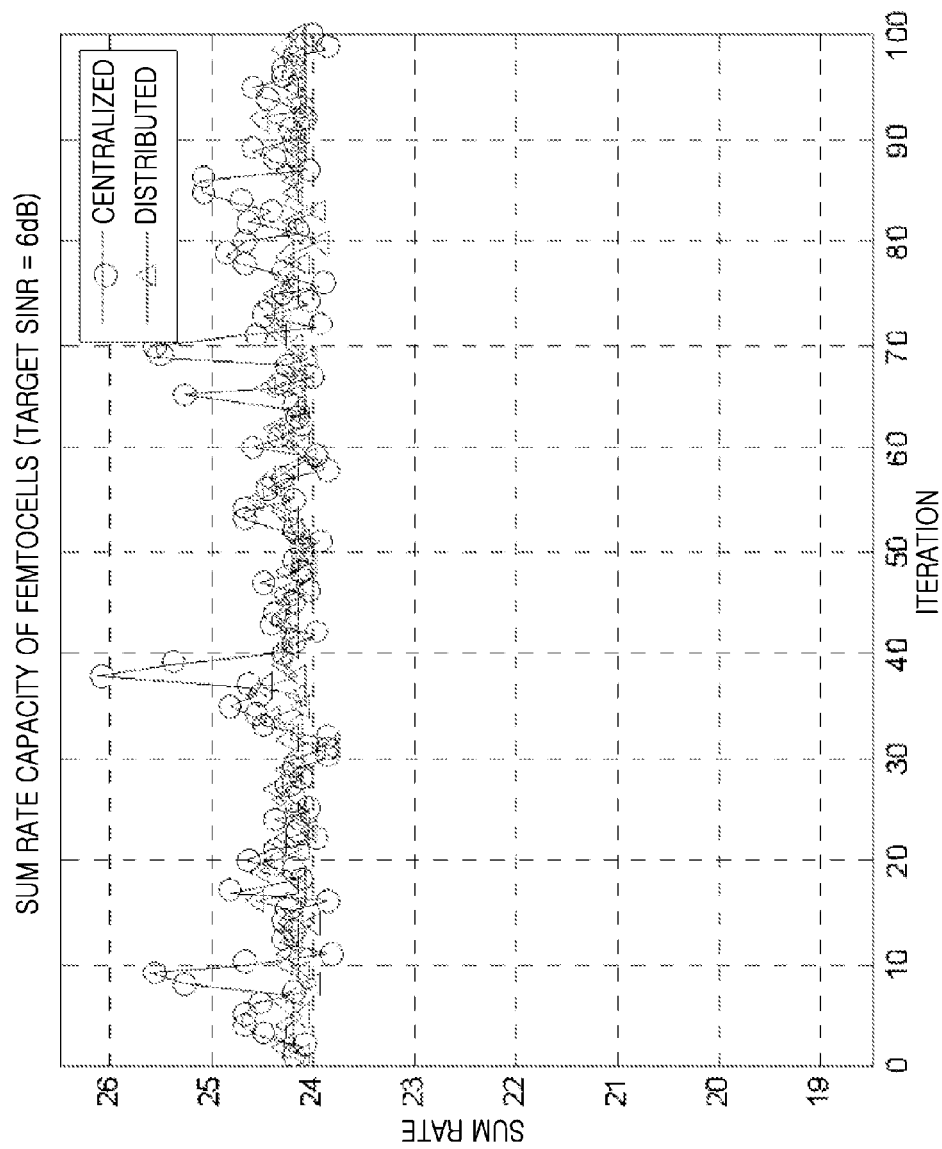

APPARATUS AND METHOD FOR CLUSTER BASED OPPORTUNISTIC POWER CONTROL IN WIRELESS COMMUNICATION SYSTEM

PRIORITY

This application claims the benefit under 35 U.S.C. §119(a) of a Korean patent application filed in the Korean Intellectual Property Office on Nov. 8, 2010 and assigned Serial No. 10-2010-0110281, the entire disclosure of which is hereby incorporated by reference.

BACKGROUND OF THE INVENTION

1. Field of the Invention

The present invention relates to a wireless communication system. More particularly, the present invention relates to an apparatus and a method for minimizing an aggregate interference occurring between a macro cell and a femto cell and improving a data processing rate of the macro cell and the femto cell in a Heterogeneous Network (HetNet).

2. Description of the Related Art

To meet a request for an increasing user data service and use a network of a better environment, a small scale Low Power Node (LPN) is installed.

When a HetNet for serving a small scale region of an indoor/outdoor space is configured using a pico cell, a femto cell, and wireless relays of low power, a capacity may be increased at low cost. Hereinafter, a pico cell, a femto cell, and wireless relays are collectively called a femto cell.

FIG. 1 is a view illustrating a structure of a general HetNet according to the related art.

Referring to FIG. 1, in a Heterogeneous Network 120, a plurality of femto cells 130 exist inside the cell coverage of a macro base station (evolved Node B (eNB)) 100.

In this case, uplink signals of the plurality of femto cells 130 may have an influence on a macro User Equipment (UE) 110.

That is, as a cellular environment that has been formed of one kind of cell is gradually complicated and evolves into a HetNet structure where various kinds of cells are mixed. Accordingly, this results in an interference between a macro cell and a femto cell generated under a HetNet environment.

In a case of an area where femto cells are concentrated, such as a complex shopping mall and an apartment complex, performance of a macro cell and a femto cell may be deteriorated due to an aggregate interference caused by each femto cell.

Therefore, a need exists for an apparatus and a method for controlling and canceling an aggregate interference.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for a cluster-based opportunistic power control in a wireless communication system.

Another aspect of the present invention is to provide an apparatus and a method for minimizing an aggregate interference occurring between a macro cell and a femto cell, and improving a data processing rate of the macro cell and the femto cell in a wireless communication system.

Still another aspect of the present invention is to provide an apparatus and a method for reducing an overhead and complexity of a base station and a user, and allocating power to a femto cell with consideration of large-scale fading in order to efficiently control an interference in a wireless communication system.

Yet another aspect of the present invention is to provide an apparatus and a method for limiting an interference of each femto cell based on an outage in order to provide high Quality of Service (QoS) of a macro cell user even when uncertainty, such as shadowing generated due to the user's movement, exists in a wireless communication system.

Still yet another aspect of the present invention is to provide an apparatus and a method for increasing a data processing rate while providing high QoS of a macro cell by detecting and reflecting the number of femto cells that actively operate inside one cluster in order to efficiently allocate power in a wireless communication system.

In accordance with an aspect of the present invention, a method for a cluster-based power control at a macro base station in a wireless communication system is provided. The method includes broadcasting an interference allowance value determined based on a predefined aggregate interference to a femto cell, updating the interference allowance value with consideration of a channel activity for each femto cell group on a cluster basis, and when detecting a change in an aggregate interference generated due to femto cell power allocation, repeating determination of an interference allowance value so that a QoS of a macro cell user is met, and broadcasting the interference allowance value to a femto cell.

In accordance with another aspect of the present invention, a method for a cluster-based power control at a femto base station in a wireless communication system is provided. The method includes receiving an interference allowance value determined based on a predefined aggregate interference from a macro base station, allocating power to a terminal with consideration of a path loss in a range of an interference allowance value received based on position information of the femto base station, updating the interference allowance value with consideration of a channel activity for each femto cell group on a cluster basis, and receiving an interference allowance value determined such that a QoS of a macro cell user is met from the macro base station.

In accordance with still another aspect of the present invention, an apparatus of a macro base station for performing a cluster-based power control in a wireless communication system is provided. The apparatus includes a backhaul communication unit for communicating with a different node, and a controller for broadcasting an interference allowance value determined based on a predefined aggregate interference via the backhaul communication unit to a femto cell, for updating the interference allowance value with consideration of a channel activity for each femto cell group on a cluster basis, and when detecting a change in an aggregate interference generated due to femto cell power allocation, for determining an interference allowance value so that a QoS of a macro cell user is met, and broadcasting the interference allowance value to a femto cell.

In accordance with yet another aspect of the present invention, an apparatus of a femto base station for performing a cluster-based power control in a wireless communication system is provided. The apparatus includes a backhaul communication unit for communicating with a different node, and a controller for receiving an interference allowance value determined based on a predefined aggregate interference via the backhaul communication unit from a macro base station, for allocating power to a terminal with consideration of a path loss in a range of an interference allowance value received based on position information of the femto base station, for updating the interference allowance value with consideration of a channel activity for each femto cell group on a cluster basis, and for receiving an interference allowance value determined such that a QoS of a macro cell user is met from the macro base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 11A is a graph illustrating data processing depending on a target SINR when a distance between a femto cell and a femto terminal is 10 m according to an exemplary embodiment of the present invention;

Throughout the drawings, like reference numerals will be understood to refer to like parts, components and structures.

DETAILED DESCRIPTION OF EXEMPLARY EMBODIMENTS

Figure 1:
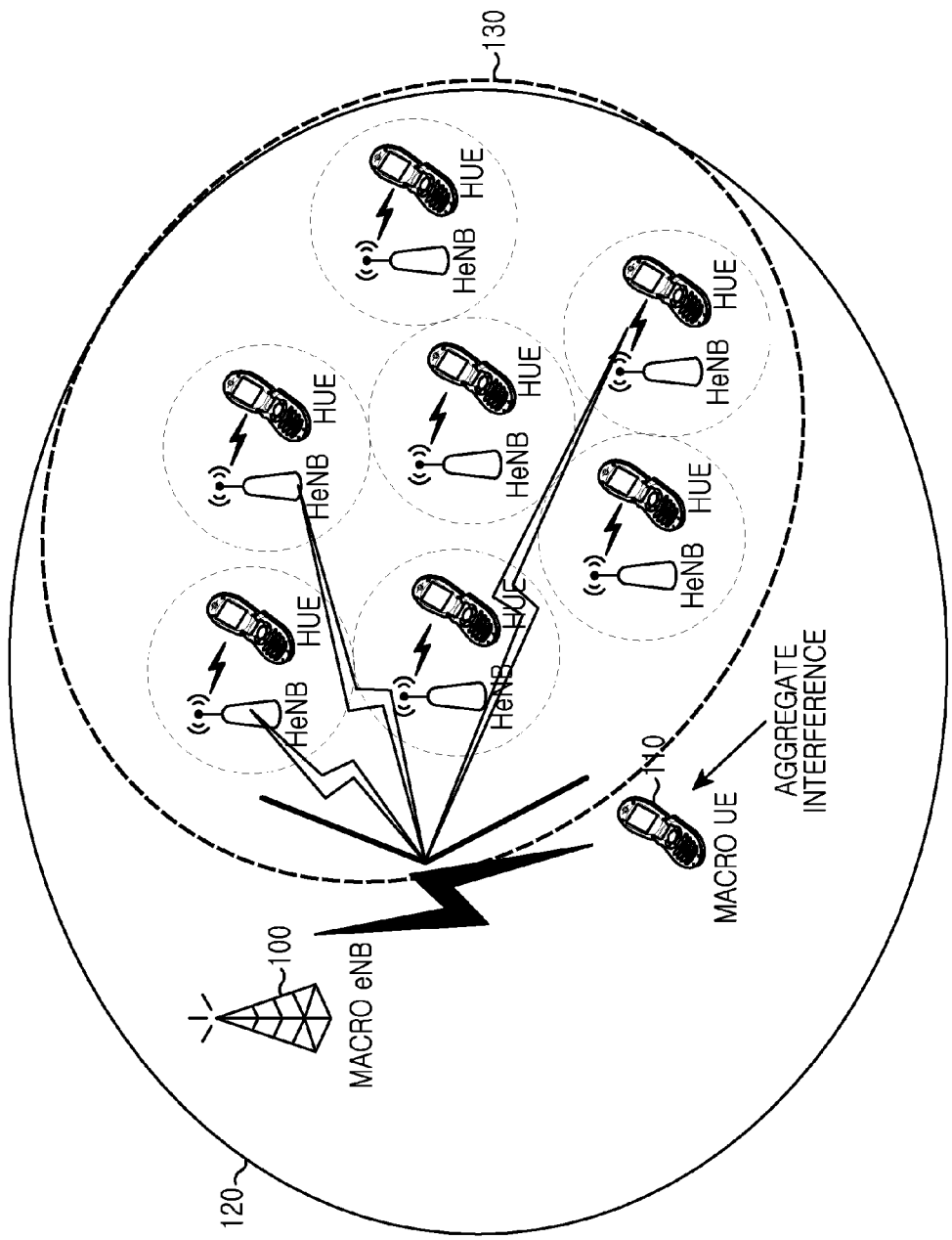
FIG. 1 is a view illustrating a structure of a general Heterogeneous Network (HetNet) according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, determination error, determination accuracy limitations and other factors known to skill in the art, may occur in amounts that do not preclude the effect the characteristic was intended to provide.

Exemplary embodiments of the present invention provide an apparatus and a method for a cluster-based opportunistic power control in a wireless communication system.

In the following description, exemplary embodiments of the present invention consider that a macro cell and a macro cell base station, and a femto cell and a femto base station are the same in their meaning.

To control an aggregate interference, uplink Quality of Service (QoS) of a macro cell user should be met and resources should be allocated such that data processing rates of a macro cell and a femto cell are maximized.

Therefore, to meet an uplink QoS condition of a macro cell, a system should be designed such that a minimum SINR of the macro cell is met, and power of a femto cell should be allocated such that an interference of the femto cell in the macro cell is limited, and data processing rates of the macro cell and the femto cell are increased.

For this purpose, an exemplary method for controlling an aggregate interference based on a utility function is proposed. The utility function has a hierarchical structure that provides high QoS of a macro cell user with a first priority and that provides high QoS of a femto cell user with a second priority. Since all information is known, instantaneous use of channel information is possible, and Nash equilibrium operates on the assumption that global equilibrium is met.

FIGS. 2 through 11C, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 2:
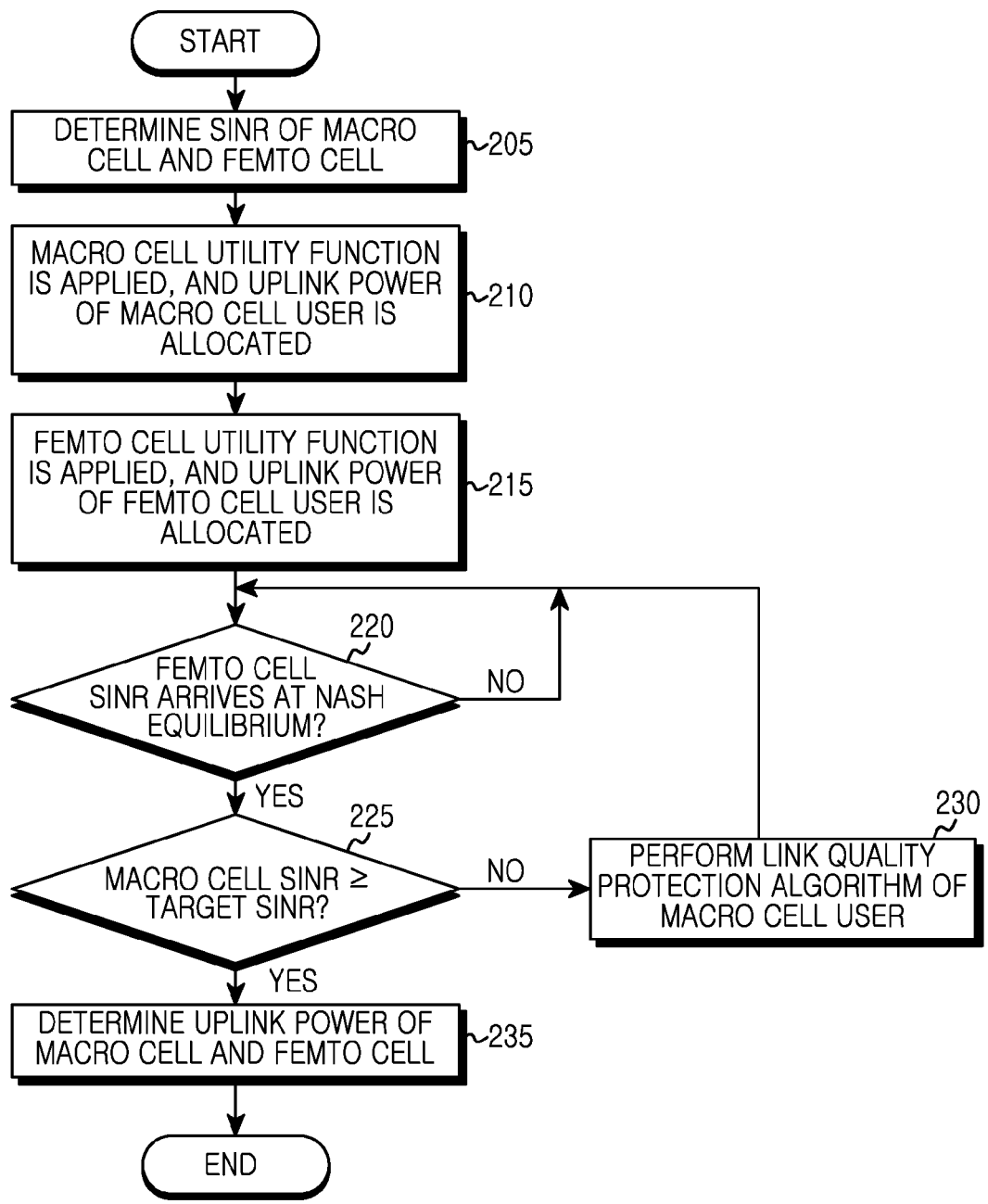
FIG. 2 is a flowchart illustrating a utility-based power allocation method according to an exemplary embodiment of the present invention.

FIG. 2 is a flowchart illustrating a utility-based power allocation method according to an exemplary embodiment of the present invention.

Referring to FIG. 2, to allocate uplink signal power of each macro cell and each femto cell, an interference entering oneself is determined, so that a Signal-to-Interference-plus-Noise Ratio (SINR) is determined in step 205.

For a macro cell, which is a priority cell, to meet a target SINR suitable for uplink QoS, a utility function is applied, so that uplink signal power suitable for the macro cell is allocated in step 210.

To allocate uplink signal power of a femto cell user, uplink power is allocated using channel information of each femto cell user in step 215.

In this case, the femto cell considers channel gains of the macro cell and itself. When the channel gain is high, the femto cell allocates high power to process relatively large amount of data. When an inter-layer interference channel gain is high, the femto cell allocates low power to reduce the interference to tune a target SINR of itself. In addition, the femto cell allocates power to increase a data processing rate. Power allocation for each femto cell is performed until Nash equilibrium arrives.

When the power allocation for each femto cell reaches Nash equilibrium in step 220, the macro base station determines an SINR of a macro cell user signal to determine whether a target SINR is met in step 225.

When the target SINR of the macro cell is not met in step 225, the macro base station performs a link quality protection algorithm for forcibly reducing power allocated to a femto cell generating a high interference in order to meet the target SINR of the macro cell in step 230.

Thereafter, the macro base station performs a power allocation algorithm of the femto cell until Nash equilibrium is reached.

In contrast, when an SINR of a macro cell user signal meets a target SINR in step 225, uplink powers of the macro cell and the femto cell are determined as powers allocated in step 210 and step 215, respectively in step 235.

To allocate uplink power of the femto cell, channel gain information between the macro base station and the femto cell user is needed.

However, since the channel gain information is difficult to obtain in an aspect of designing an actual system and tracking of instantaneous channel information increases complexity of the system, a method for reducing an interference without the channel gain information is needed.

In addition, the utility-based power allocation method continuously performs the algorithm until Nash equilibrium is reached. This process takes a considerable amount of time and even when Nash equilibrium is reached, it may be difficult for Nash equilibrium to ensure equilibrium of the system.

To reduce an overhead and complexity of a base station and a user, and to efficiently control an interference, exemplary embodiments of the present invention allocate power of a femto cell with consideration of large-scale fading.

In this case, an interference of each femto cell is limited based on an outage in order to provide high QoS of a macro cell user even when uncertainty, such as shadowing generated due to a user's movement, exists.

In addition, to efficiently allocate power, the number of femto cells actively operating inside one cluster are detected and reflected, so that high QoS of a macro cell is provided and a data processing rate may be increased.

An exemplary embodiment of the present invention sets an interference allowance value per femto cell based on outage probability to provide high QoS of a macro cell, and introduces a detecting technique to increase data processing rate.

First, channel gain information of a lognormal characteristic based on a large-scale is described below.

Tracking an instantaneous channel gain causes a considerable overhead to the system, and it is practically impossible to obtain channel information causing a mutual interference between different layers of a femto cell and a macro cell. Accordingly, exemplary embodiments of the present invention are based on a large-scale channel information gain.

Signals received from a macro cell user and a femto cell user, respectively, may be represented by Equation (1) below.

$$p_i g_{ij} = p_i r_i^{-\alpha_i} 10^{\xi_i/10} = 10^{x_i/10} \qquad (1)$$

where $p_i$ denotes power allocated to a user of an $i^{th}$ cell and $g_{ij}$ denotes a channel gain. At this point, when i=0, it denotes a macro cell, and when i is not equal to 0, it denotes an $i^{th}$ femto cell.

$g_{ij}$ denotes an inter-user channel of a base station of an $i^{th}$ cell and a user of a $j^{th}$ cell. The first equation of Equation (1) may be represented in terms of $r_i^{-\alpha_i}$ having an exponent of $\alpha_i$ and representing signal power attenuation depending on a distance and $10^{\xi_i/10}$ having a characteristic of a lognormal random variable depending on shadowing generated due to movement of a terminal as in the second equation of Equation (1).

It is assumed that $\alpha_i$ in $r_i^{-\alpha_i}$ is $\alpha_c$ inside a macro cell, is $\alpha_{f1}$ between a femto cell and users supported by a femto cell, and is $\alpha_{f2}$ between a femto cell and a user of a different femto cell, or between a macro cell and a femto cell user.

At this point, when a lognormal random variable is multiplied by a value which is a constant, the result is also a lognormal random variable, so that this may be expressed in terms of $10^{x_i/10}$ which is one lognormal random variable. $10^{x_i/10}$ has a dispersion of $\sigma_c^2$, which is a shadowing dispersion of a macro cell when i is 0, and has a dispersion of $\sigma_f^2$, which is a shadowing dispersion of a femto cell when i is not equal to 0.

A probabilistic characteristic of Y from SINR ($\gamma_0$) of a determined macro cell is described below.

Uplink QoS of a macro cell user is expressible based on an SINR of a user signal determined by a macro base station. Therefore, an outage probability may be applied by analyzing a probabilistic characteristic of an SINR of a signal received by the macro base station.

To facilitate a probabilistic characteristic analysis of a macro cell SINR, Y is defined and analyzed using a reciprocal number of an SINR of the macro cell, where $Y=1/\gamma_0$. Y can be expressed using Equation (2) below.

$$Y = \frac{\sum_{i=1}^{N} p_i g_{0i} + \sigma_n^2}{p_0 g_{00}} \cong \sum_{i=1}^{N} 10^{\xi_i^*/10} = 10^{z/10} \quad (2)$$

where a nominator denotes that sum of interferences in a macro cell from uplink signals of respective femto cell users and power of a noise are summed. A denominator is a signal received from a macro cell user by a macro base station, and is expressible using $p_0 g_{00}$ as described above.

At this point, in the second equation of Equation (2), assuming that an influence of a noise is trivial, the nominator can be expressed as the sum of lognormal random variables due to shading of respective femto cells, and the denominator can be expressed as one lognormal random variable. In addition, a ratio of a lognormal random variable and a different lognormal random variable is also a lognormal random variable.

Therefore, when equations of the nominator and the denominator are combined, they are expressible in terms of sum of N lognormal random variables $10^{\xi_i^*/10}$, and this is expressible again in terms of $10^{z/10}$ having one lognormal random variable characteristic.

Here, N is the number of femto cells causing an interference. Therefore, a probabilistic characteristic of Y is expressible in terms of an average $\mu_z$ and a dispersion $\sigma_z^2$ of $10^{z/10}$.

$\mu_z$ and $\sigma_z^2$, for analyzing a probabilistic characteristic of Y, may be determined from the second equation and the fourth equation which are two equations expressing the same Y in Equation (2).

That is, Equation (3) and Equation (4) below may be determined using simultaneous equations $\mu_z$ and $\sigma_z^2$ obtained using sum of $10^{\xi_i/10}$ averages, a dispersion using this, and a FentonWilkinson method.

$$\mu_z = \frac{10}{\ln 10} \left\{ \ln N + \ln P_r - \ln(P_0 r_0^{-\alpha_c}) - \frac{1}{2} \ln\left[\frac{1}{N} e^{a^2(\sigma_c^2 + \sigma_f^2)} + \left(1 - \frac{1}{N}\right)\right] \right\} \quad (3)$$

$$\sigma_z^2 = \sigma_c^2 + \sigma_f^2 \quad (4)$$

An interference allowance value $P_r$ per femto cell based on an outage probability is described below.

When an outage probability is applied in order to provide high QoS of a macro cell user, the following equation is obtained.

$$P_r[\gamma_0 < \Gamma_0] < \partial_{=1-Q}\left(\frac{\mu_z + \frac{10}{\ln 10} \ln \Gamma_0}{\sigma_z}\right) \quad (5)$$

where $\Gamma_0$ denotes a target SINR of a macro cell, and $\delta$ denotes a maximum allowance probability when a macro cell cannot meet the target SINR. The second equation of Equation (5) is a changed outage probability equation when Y, which is a lognormal random function, is applied. At this point, since $\mu_z$ is expressible in terms of $P_r$ and N, an outage probability is expressible in terms of a function of $P_r$ and N as illustrated in Equation (6) below.

$$P_r[\gamma_0 < \Gamma_0] = 1 - Q(f(P_r, N)) < \delta \quad (6)$$

Therefore, when N, which is the number of actively operating femto cells, is known in Equation (6), an interference allowance value per femto cell may be determined.

An exemplary technique for detecting an operating femto cell is described below.

Only an actively operating femto cell in a cluster including a plurality of femto cells existing inside one cluster causes an interference in a macro cell. Therefore, when the number of femto cells that do not operate is high, more uplink power may be allocated to an operating femto cell.

When this opportunistic power control is performed, a data processing rate of each femto cell increases, and consequently, information capacity may be increased.

Therefore, this detecting technique may increase information capacity while limiting an interference in a macro cell.

A self configuring technique of these detecting techniques is described below.

The self configuring technique is a technique for determining the number N of femto cells actively operating inside a femto cell by determining an interference in a macro base station by a femto cell.

Since only an actively operating femto cell sends an interference signal, an interference signal of signals received by a macro base station is expressible using Equation (7).

$$\sum_{i=1}^{N} P_i g_{0i} + \sigma_n^2 \cong \sum_{i=1}^{N} P_r \cdot 10^{\xi_i/10} = P_{I,max} \quad (7)$$

In this case, since an interference allowance value of each femto cell has been allocated as $P_r$, assuming that an influence of a noise of an interference signal is trivial, the interference signal $P_{I,max}$ can be expressed using sum of N lognormal random variable $P_r \cdot 10^{\xi_i/10}$, as illustrated in the second equation of Equation (7).

Assuming that respective femto cell interference signals are independent of each other and have the same probabilistic distribution (independently and identically distributed (i.i.d)), a first moment $E\{P_{I,max}\}$ of $P_{I,max}$ can be expressed as the sum of averages of respective lognormal random variables $P_r \cdot 10^{\xi_i/10}$, and when a second moment $E\{P_{I,max}^2\}$ value is determined by applying this, Equation (8) is obtained.

$$E\{P_{I,max}\} = N \cdot P_r \cdot e^{1/2 a^2 \sigma_f^2} \quad (8)$$

$$E\{P_{I,max}^2\} = E\{P_{I,max}\}^2 (1 - 1/N) + 1/N \cdot E\{P_{I,max}\}^2 e^{a^2 \sigma_f^2} \quad (9)$$

When Equation (8) and Equation (9) above are simultaneously met, $\hat{N}$ may be determined as in Equation (10) below.

$$\hat{N} = \frac{e^{a^2 \sigma_f^2} - 1}{\frac{E\{P_{I,max}^2\}}{E\{P_{I,max}\}^2} - 1} \quad (10)$$

A self optimizing technique of these detecting techniques is described below.

The self optimizing technique sequentially collects Identifications (IDs) of different femto cells inside a cluster to which a femto cell belongs and identifies whether a femto cell actively operates to determine transmission power of the femto cell (i.e., an interference allowance value in an aspect of a base station).

In a case of the self optimizing technique, since a macro base station cannot know the number of femto cells operating in a cell area of the macro base station, the macro base station determines $P_r$ and allocates an interference allowance value of each femto cell on the assumption that all femto cells are operating.

Each femto cell combines this allocated $P_r$ with information of the number of femto cells actively operating inside the cluster to which the femto cell itself belongs to finally determine the power of the femto cell itself Exemplary embodiments of the present invention may be divided into a process for determining an interference allowance value per femto cell from the above-described outage probability and a detecting process for determining a femto cell operating inside a cluster.

The process for determining an interference allowance value per femto cell from the outage probability is described with reference to FIG. 3. The detecting process is divided into a self configuring technique and a self optimizing technique.

The self configuring technique determines the number of femto cells operating inside a cluster based on an interference signal received by a macro base station and is described with reference to FIG. 4.

The self optimizing technique divides one cluster into a plurality of clusters based on a detecting region of each femto cell and allows a femto cell inside each cluster to determine a neighbor femto cell to detect an operating femto cell. The self optimizing technique is described with reference to FIG. 5.

Figure 3:
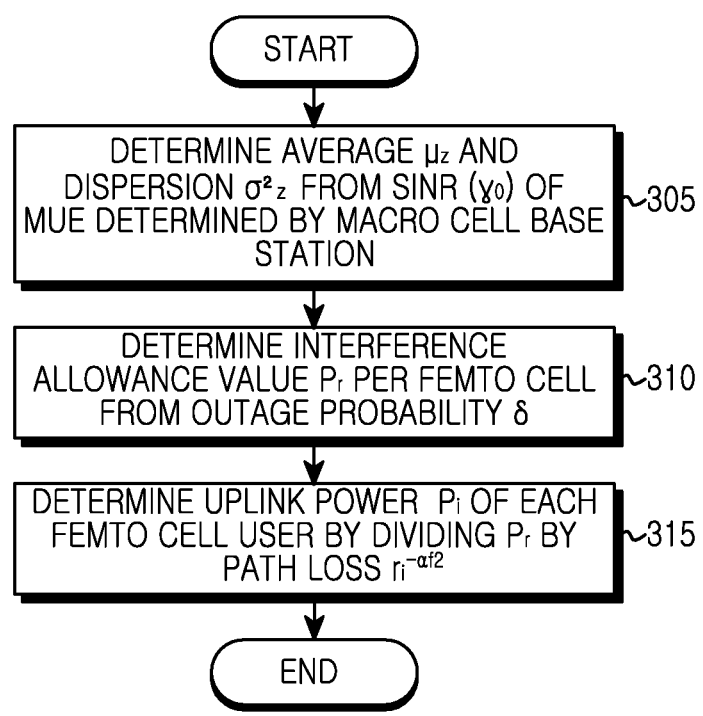
FIG. 3 is a flowchart illustrating an uplink power allocation technique of a femto cell according to an exemplary embodiment of the present invention.

FIG. 3 is a flowchart illustrating an uplink power allocation technique of a femto cell according to an exemplary embodiment of the present invention.

Referring to FIG. 3, a macro base station determines an average and a dispersion of Y from an SINR ($\gamma_0$) of a received macro cell user signal in step 305.

The macro base station determines an interference allowance value $P_r$ per femto cell such that the received SINR ($\gamma_0$) of the macro cell user meets a probability that does not meet a target SINR ($\Gamma_0$) in step 310. The interference allowance value $P_r$ per femto cell is broadcast to a femto cell.

Since the interference allowance value $P_r$ per femto cell is a value obtained by multiplying uplink power $P_i$ of a femto cell user by a power loss equation depending on a distance between a user of each femto cell and a macro base station, a femto base station divides $P_r$ by a power loss value $r_i^{-\alpha/2}$ depending on a distance between a user of each femto cell and a macro base station to allocate uplink power $P_i$ of the femto base station in step 315. As a result, the uplink power $P_i$ becomes an interference allowance value in an aspect of the macro base station.

Figure 4:
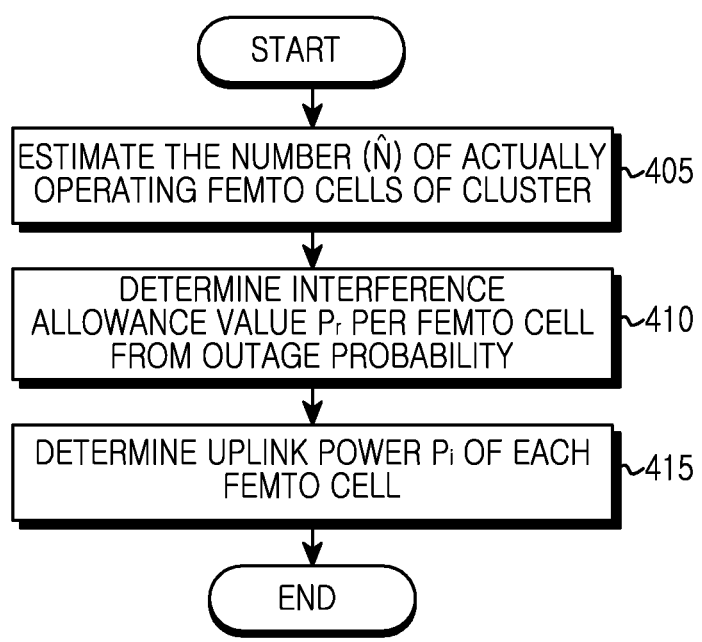
FIG. 4 is a flowchart illustrating an uplink power allocation technique of a femto cell that applies a self configuring technique according to an exemplary embodiment of the present invention.

FIG. 4 is a flowchart illustrating an uplink power allocation technique of a femto cell that applies a self configuring technique according to an exemplary embodiment of the present invention.

Referring to FIG. 4, a macro base station applies a self configuring method to determine the number $\hat{N}$ of femto cells actively operating inside a cluster using a first moment $E\{P_{I,max}\}$ and a second moment $E\{P_{I,max}^2\}$ of an interference signal in the macro cell by a user of each femto cell in step 405.

The macro base station applies the number $\hat{N}$ of the actively operating femto cells to an outage probability to determine an interference allowance value $P_r$ per femto cell in step 410. The interference allowance value $P_r$ per femto cell is broadcast to a femto cell.

Since the interference allowance value $P_r$ per femto cell is a value obtained by multiplying uplink power $P_i$ of a femto cell user by a power loss equation depending on a distance between a user of each femto cell and a macro base station, a femto base station divides $P_r$ by a power loss value $r_i^{-\alpha/2}$ depending on a distance between a user of each femto cell and a macro base station to allocate the uplink power $P_i$ of a femto cell to each femto cell in step 415. As a result, the uplink power $P_i$ becomes an interference allowance value in an aspect of the macro base station.

Figure 5:
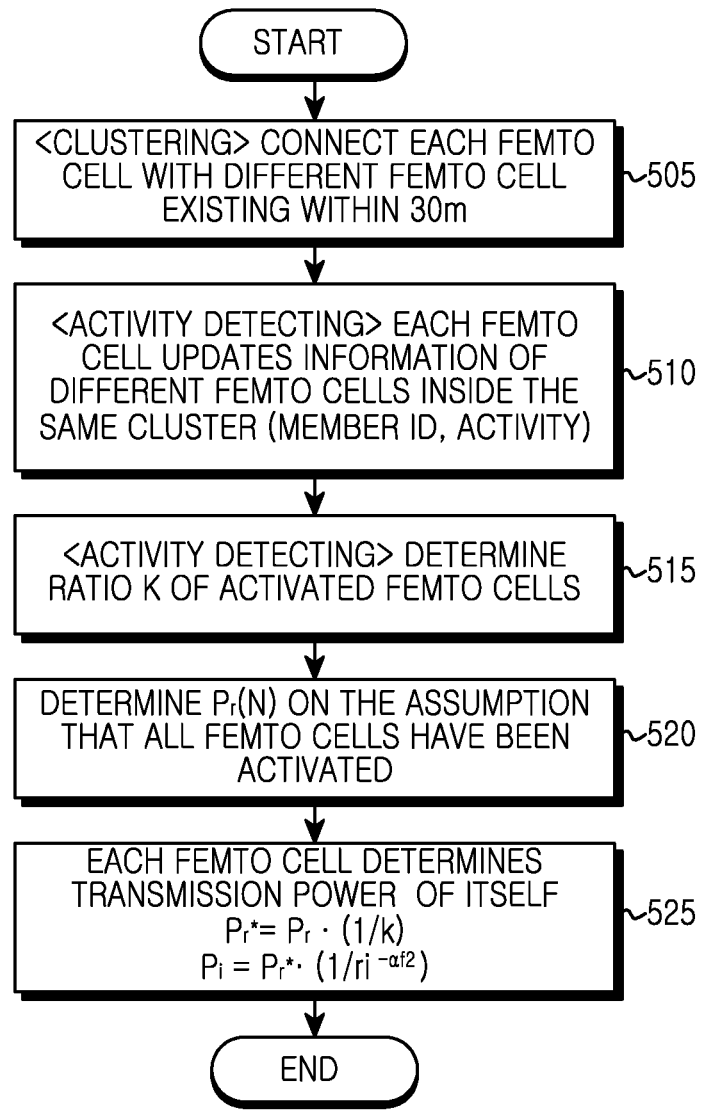
FIG. 5 is a view illustrating an uplink power allocation technique of a femto cell that applies a self optimizing technique according to an exemplary embodiment of the present invention.
Figure 6:
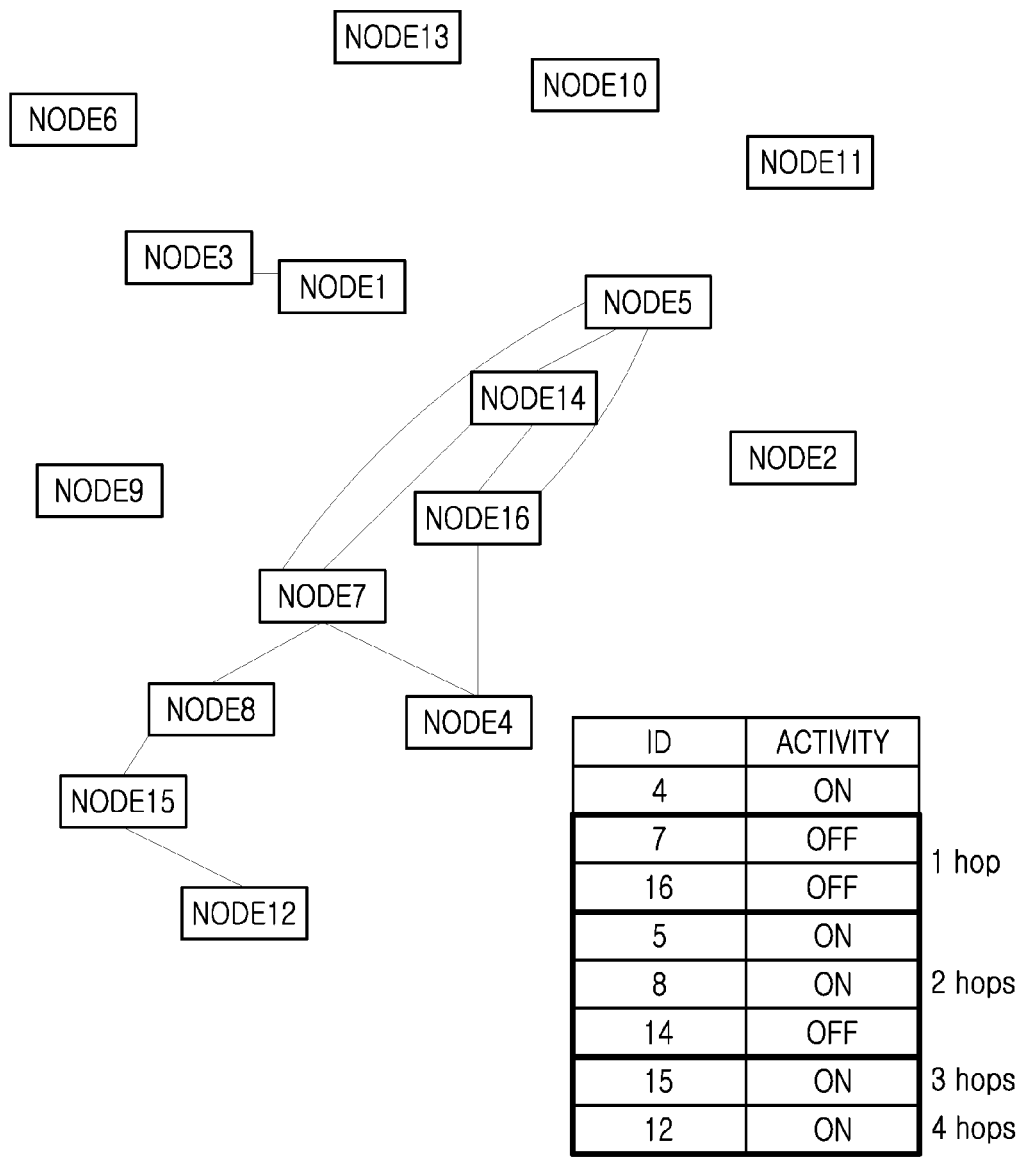
FIG. 6 is a view illustrating a technique for detecting activity in a self optimizing technique according to an exemplary embodiment of the present invention.

FIG. 5 is a view illustrating an uplink power allocation technique of a femto cell that applies a self optimizing technique according to an exemplary embodiment of the present invention and FIG. 6 is a view illustrating a technique for detecting activity in a self optimizing technique according to an exemplary embodiment of the present invention.

Referring to FIGS. 5 and 6, all femto cells detect different femto cells existing within 30 m from the relevant femto cell itself Detected femto cells are connected to generate a group of a new cluster in step 505.

Each femto cell generates a space for storing IDs of different femto cells inside the same cluster and whether the different femto cells have activity, and stores relevant information in a storage space, thereby performing detecting femto cell activity in step 510.

A node No. 4 of FIG. 6 illustrates that a femto cell actively operates inside a cluster. The node No. 4 updates IDs and activity information of a node No. 7 and a node No. 16 directly connected with the node No. 4 in a storage space. This is called information that can be known at 1 hop. Here, a node denotes a femto cell and a number of a node denotes an ID of each femto cell.

IDs and activity information of different femto cells directly connected to the node No. 7 and the node No. 16 updated at 1 hop, that is, a node No. 5, a node No. 8, and a node No. 14, are updated again in the storage space. This is called information that can be known at 2 hops.

When a node No. 4 passes through a process of 4 hops in total in this manner, no more different femto cell ID to be updated exists, and IDs and activity of all other femto cells inside a cluster to which the node No. 4 belongs are known.

Thereafter, in step 515, each femto cell determines a ratio k of femto cells actively operating inside a cluster to which the femto cell belongs based on the result of step 510. Here, the ratio k of actively operating femto cells denotes a value obtained by dividing the number of actively operating femto cells by the number of all femto cells inside a cluster.

In the processes of steps 510 and 515, since a macro cell cannot know whether femto cells existing inside a cell region of the macro cell have activity, the macro cell determines and allocates an interference allowance value $P_r$ of each femto cell on the assumption that all femto cells are actively operating in step 520. That is, a femto cell broadcasts an interference allowance value $P_r$ of each femto cell determined on the assumption that all femto cells are actively operating.

Each femto cell determines a transmission power $P_i$ of the femto cell itself using the ratio k of actively operating femto cells and the femto cell interference allowance value $P_r$ in step 525.

The transmission power $P_i$ of the femto cell itself denotes a value obtained by dividing the femto cell interference allowance value $P_r$ allocated by a macro cell, by the ratio k of actively operating femto cells and a power loss value $r_i^{-\alpha/2}$ depending on a distance from the macro cell to a femto cell. The transmission power of step 525 is a value obtained by updating an interference allowance value transmitted by the macro base station, and becomes an interference allowance value updated by a femto cell in an aspect of the macro base station.

A cluster-based opportunistic power allocation technique allocates power of a femto cell based on channel information of a large-scale. Since this technique does not need to track instantaneous channel information, it has a considerable advantage in an aspect of a system overhead. In addition, since channel changes of shadowing generated due to movement of a terminal is reflected to an outage-based technique, uncertainty of a channel may be reduced.

In addition, an exemplary embodiment of the present invention considers only a femto cell causing an interference in order to efficiently allocate power. That is, an exemplary embodiment of the present invention detects and reflects an actively operating femto cell to set an interference allowance value per femto cell. At this point, depending on an activity detecting method, a technique using self configuring or a technique using self optimizing is used.

Figure 7:
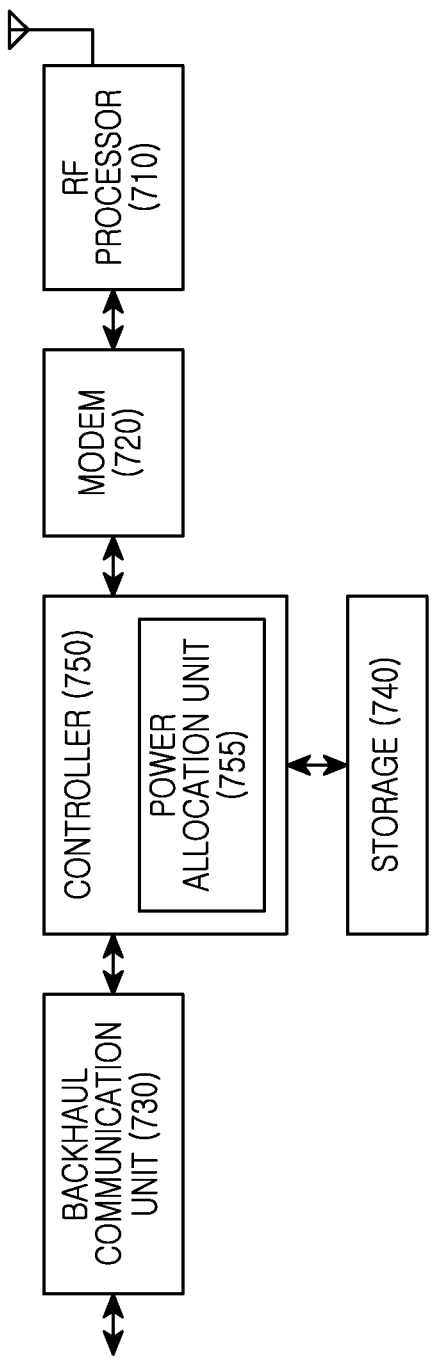
FIG. 7 is a block diagram illustrating a macro base station and a femto base station according to an exemplary embodiment of the present invention.

FIG. 7 is a block diagram illustrating a macro base station and a femto base station according to an exemplary embodiment of the present invention.

Referring to FIG. 7, the macro base station and the femto base station include a Radio Frequency (RF) processor 710, a modem 720, a backhaul communication unit 730, a storage 740, and a controller 750.

The RF processor 710 performs a function for transmitting/receiving a signal via an RF channel, such as band conversion and amplification of a signal. More specifically, the RF processor 710 up-converts a baseband signal provided from the modem 720 into an RF signal and transmits the RF signal via an antenna, and down-converts an RF signal received via the antenna into a baseband signal.

The modem 720 performs a conversion function between a baseband signal and a bit line according to a physical layer standard of a system. For example, during data transmission, the modem 720 encodes and modulates a transmission bit line to generate complex symbols, maps the complex symbols to subcarriers, and configures Orthogonal Frequency Division Multiplexing (OFDM) symbols by performing Inverse Fast Fourier Transform (IFFT) and Cyclic Prefix (CP) insertion. In addition, during data reception, the modem 720 divides a baseband signal provided from the RF processor 710 on an OFDM symbol basis, recovers signals mapped to subcarriers by performing Fast Fourier Transform (FFT), and recovers a received bit line via demodulation and decoding.

The backhaul communication unit 730 provides an interface for performing communication with a different node (for example, a macro base station or a femto base station).

The storage 740 stores a basic program for operating the base station, an application program, and data, such as user contents, and the like. In addition, the storage 740 provides stored data according to a request of the controller 750. More particularly, the storage 740 stores activity information.

The controller 750 controls an overall operation of the macro base station and the femto base station. For example, the controller 750 configures downlink data to provide the same to the modem 720, and reads uplink data provided from the modem 720. The controller 750 includes a power allocation unit 755.

In a case of the macro base station, the power allocation unit 755 determines an aggregate interference to output an interference allowance value to the backhaul communication unit 730 on a femto cell basis. The power allocation unit 755 determines a channel activity for each femto cell group of a cluster basis (e.g., a commercial area/apartment concentrated area), updates an interference allowance value when needed, and transmits the interference allowance value to the femto base station via the backhaul communication unit 730. The power allocation unit 755 may determine a channel activity depending on a regional characteristic and transmit the channel activity to the femto base station in advance via the backhaul communication unit 730.

When detecting a change in an aggregate interference generated due to femto cell power allocation, the power allocation unit 755 determines an interference allowance value so that QoS of a macro cell user is met and allocates power hierarchically to the femto cell via the backhaul communication unit 730.

In a case of the femto base station, the power allocation unit 755 allocates power to a terminal via the modem 720 with consideration of a path loss in a range of an interference allowance value received using position information of the femto base station.

The power allocation unit 755 determines a channel activity per each femto cell group of a cluster basis (e.g., a commercial area/apartment concentrated area), and updates an interference allowance value. In this case, the power allocation unit 755 determines a channel activity depending on a time characteristic and periodically updates a set interference allowance value (e.g., allocated power).

Figure 8:
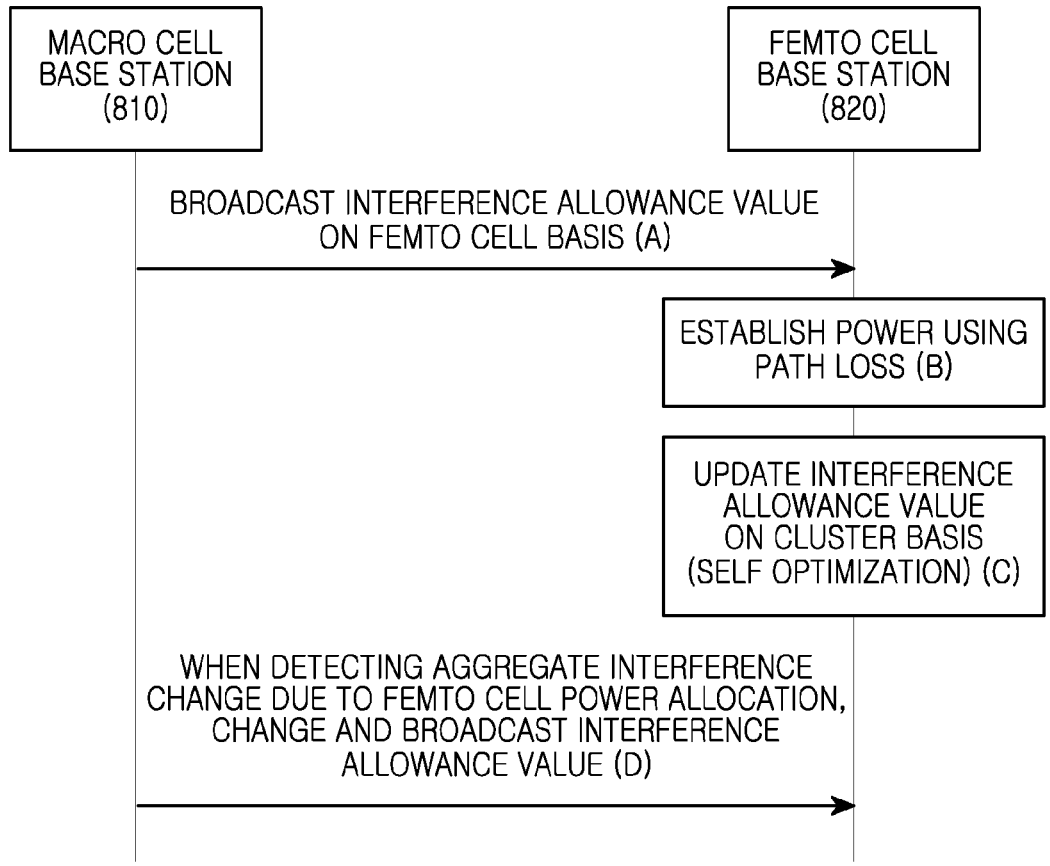
FIG. 8 is a view of a message flow illustrating an operation procedure between a macro base station and a femto base station based on a self optimizing technique according to an exemplary embodiment of the present invention.

FIG. 8 is a view of a message flow illustrating an operation procedure between a macro base station and a femto base station based on a self optimizing technique according to an exemplary embodiment of the present invention.

Referring to FIG. 8, a macro cell base station 810 determines an aggregate interference and broadcasts an interference allowance value on a femto cell basis to a femto cell base station 820 in step A.

The femto cell base station 820 allocates power to a terminal with consideration of a path loss in a range of an interference allowance value received using position information of the femto cell base station 820 in step B.

Thereafter, the femto cell base station 820 determines a channel activity for each femto cell group on a cluster basis (e.g., a commercial area/apartment concentrated area), and updates an interference allowance value in step C. In this case, the femto cell base station 820 determines a channel activity according to a time characteristic and periodically updates a set value.

Here, the interference allowance value broadcast to the femto cell base station 820 is given as the same value on a femto cell basis, and a process for determining an interference allowance value with consideration of a femto cell channel activity is independently and dispersively performed on a cluster basis.

When detecting a change in an aggregate interference generated due to femto cell power allocation, the macro cell base station 810 determines an interference allowance value so that QoS of a macro cell user is met and broadcasts the interference allowance value again in step D to allocate power hierarchically.

Figure 9:
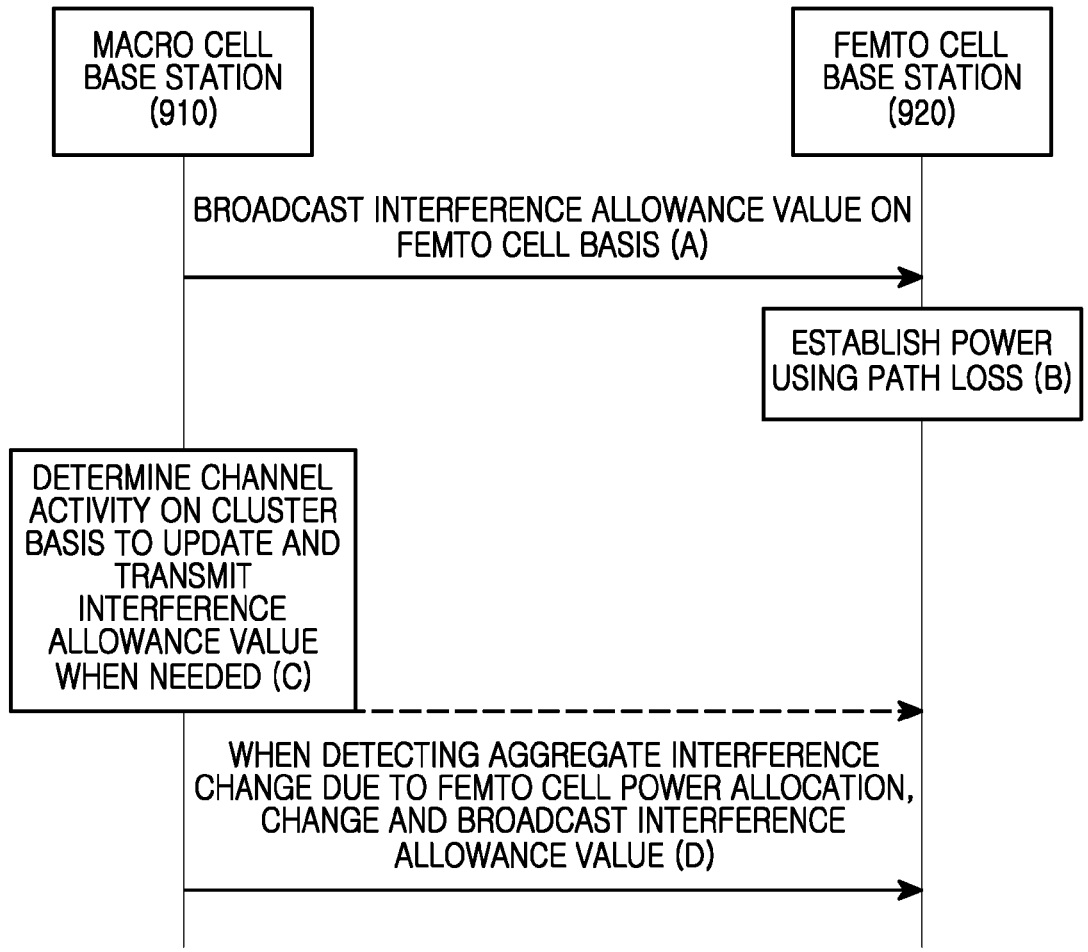
FIG. 9 is a view of a message flow illustrating an operation procedure between a macro base station and a femto base station based on a self configuring technique according to an exemplary embodiment of the present invention.

FIG. 9 is a view of a message flow illustrating an operation procedure between a macro base station and a femto base station based on a self configuring technique according to an exemplary embodiment of the present invention.

Referring to FIG. 9, a macro cell base station 910 determines an aggregate interference and broadcasts an interference allowance value on a femto cell basis to a femto cell base station 920 in step A.

The femto cell base station 920 allocates power to a terminal with consideration of a path loss in a range of an interference allowance value received using position information of the femto cell base station 920 in step B.

The macro cell base station 910 determines a channel activity for each femto cell group of a cluster basis (e.g., a commercial area/apartment concentrated area), and updates an interference allowance value and transmits the same to the femto cell base station 920 when needed in step C. In this case, the macro cell base station 810 may determine a channel activity depending on a regional characteristic and transmit the same to a femto cell in advance.

Here, the interference allowance value broadcast to the femto cell base station 920 is given as the same value on a femto cell basis, and a process for determining an interference allowance value with consideration of a femto cell channel activity is independently and dispersively performed on a cluster basis.

When detecting a change in an aggregate interference generated due to femto cell power allocation, the macro cell base station 810 determines an interference allowance value so that QoS of a macro cell user is met and broadcasts the interference allowance value again in step D to allocate power hierarchically.

Figure 10A:
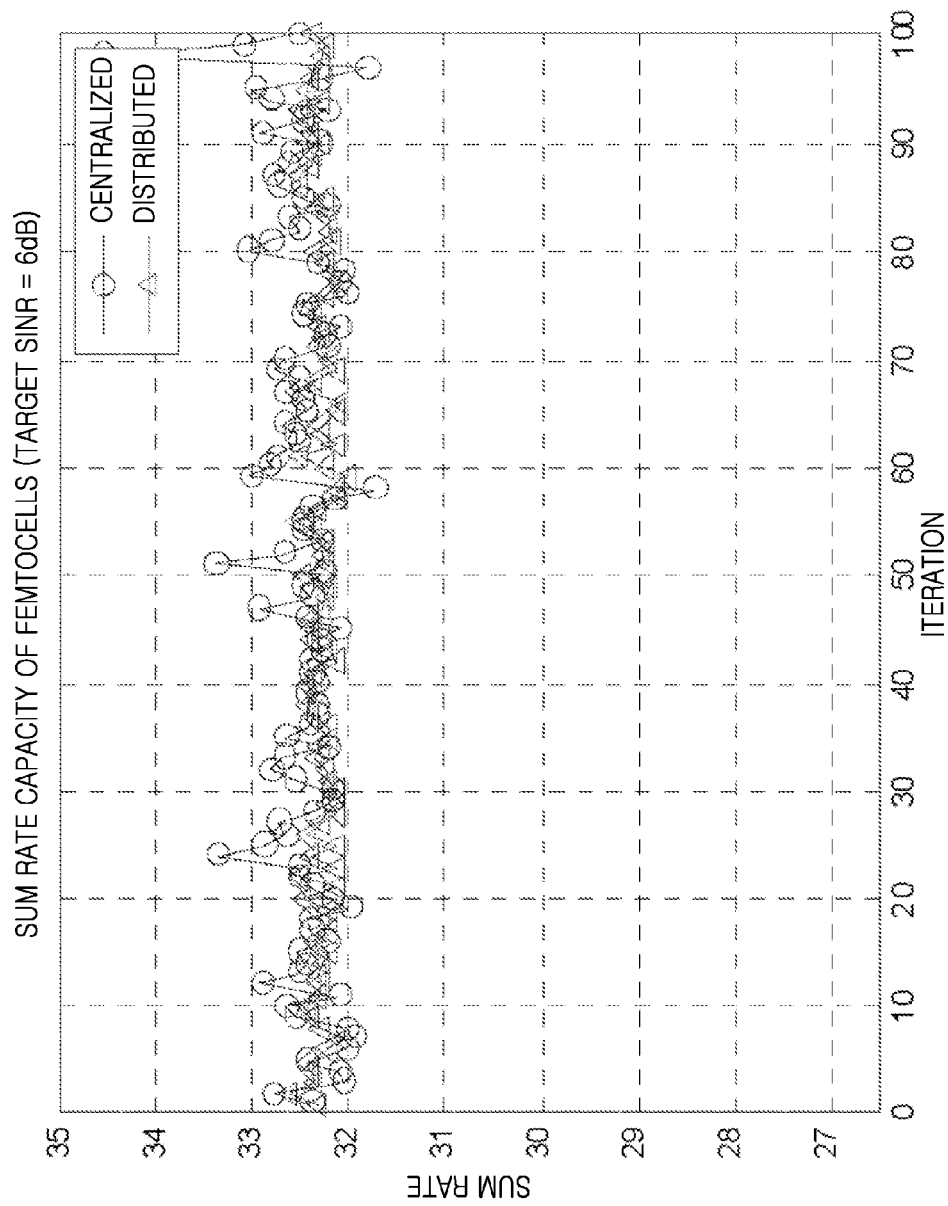
FIG. 10A is a graph illustrating data processing depending on a target Signal-to-Interference-plus-Noise Ratio (SINR) when a distance between a femto cell and a femto terminal is 5 m according to an exemplary embodiment of the present invention.
Figure 10B:
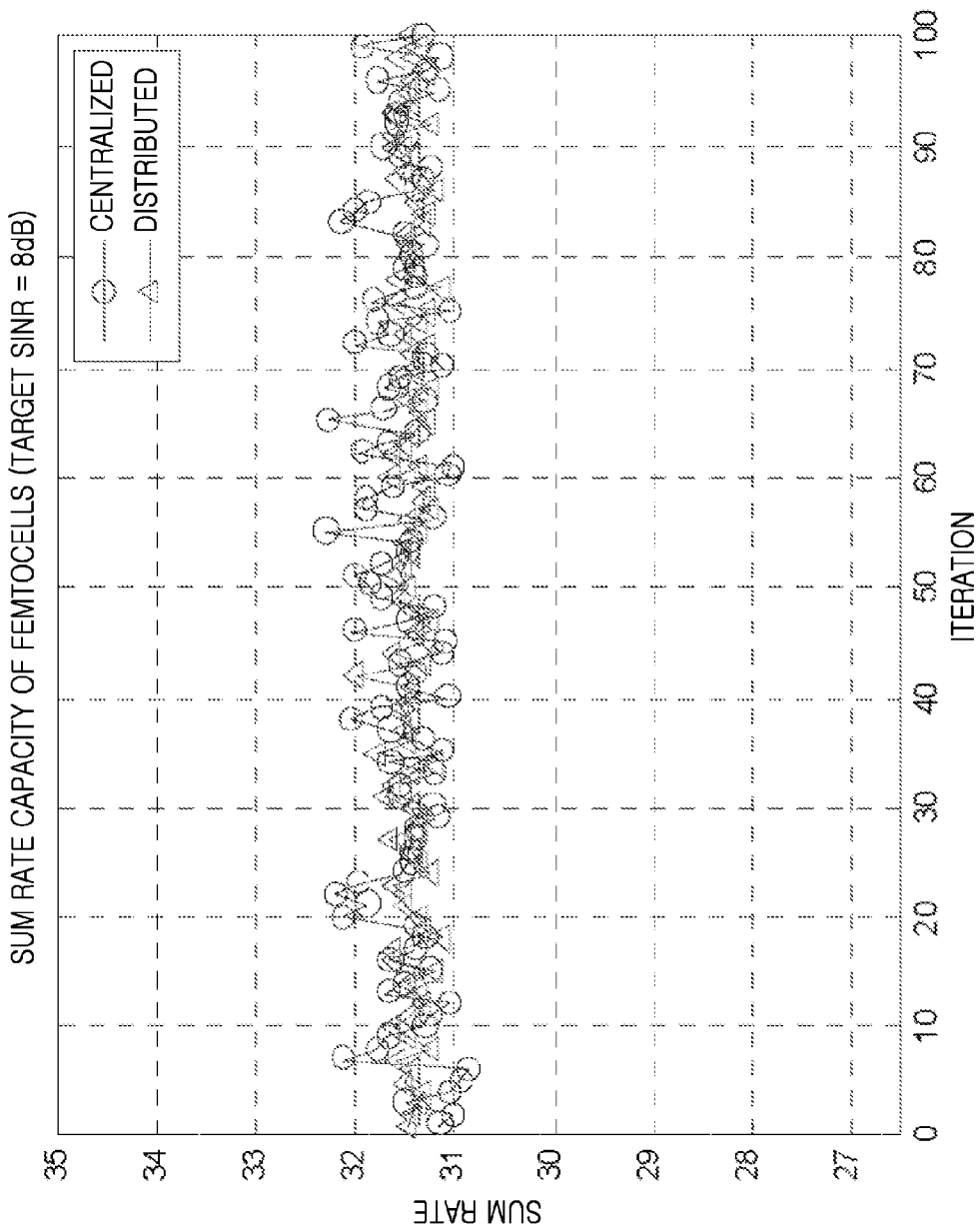
FIG. 10B is a graph illustrating data processing depending on a target SINR when a distance between a femto cell and a femto terminal is 5 m according to an exemplary embodiment of the present invention.
Figure 10C:
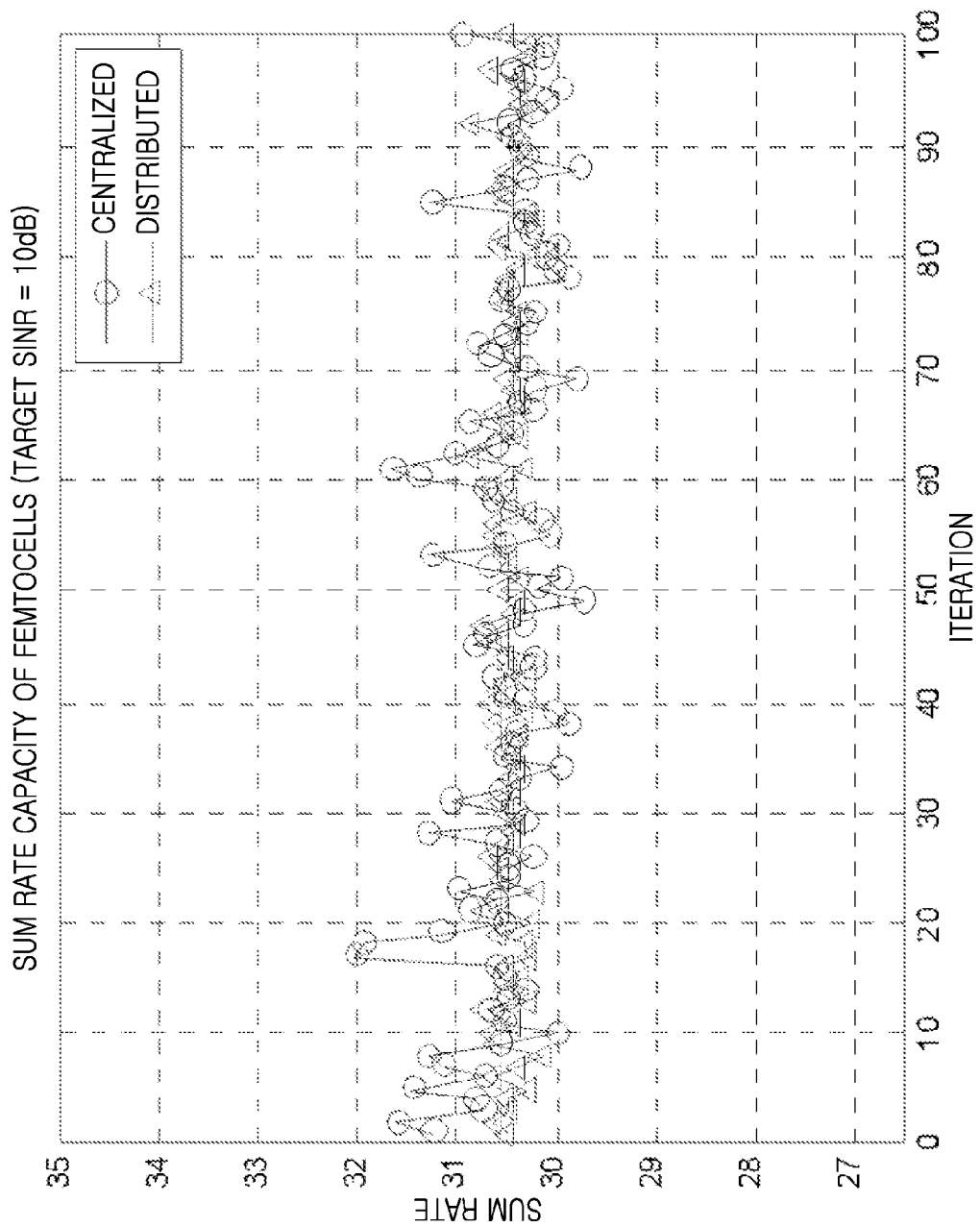
FIG. 10C is a graph illustrating data processing depending on a target SINR when a distance between a femto cell and a femto terminal is 5 m according to an exemplary embodiment of the present invention.
Figure 11B:
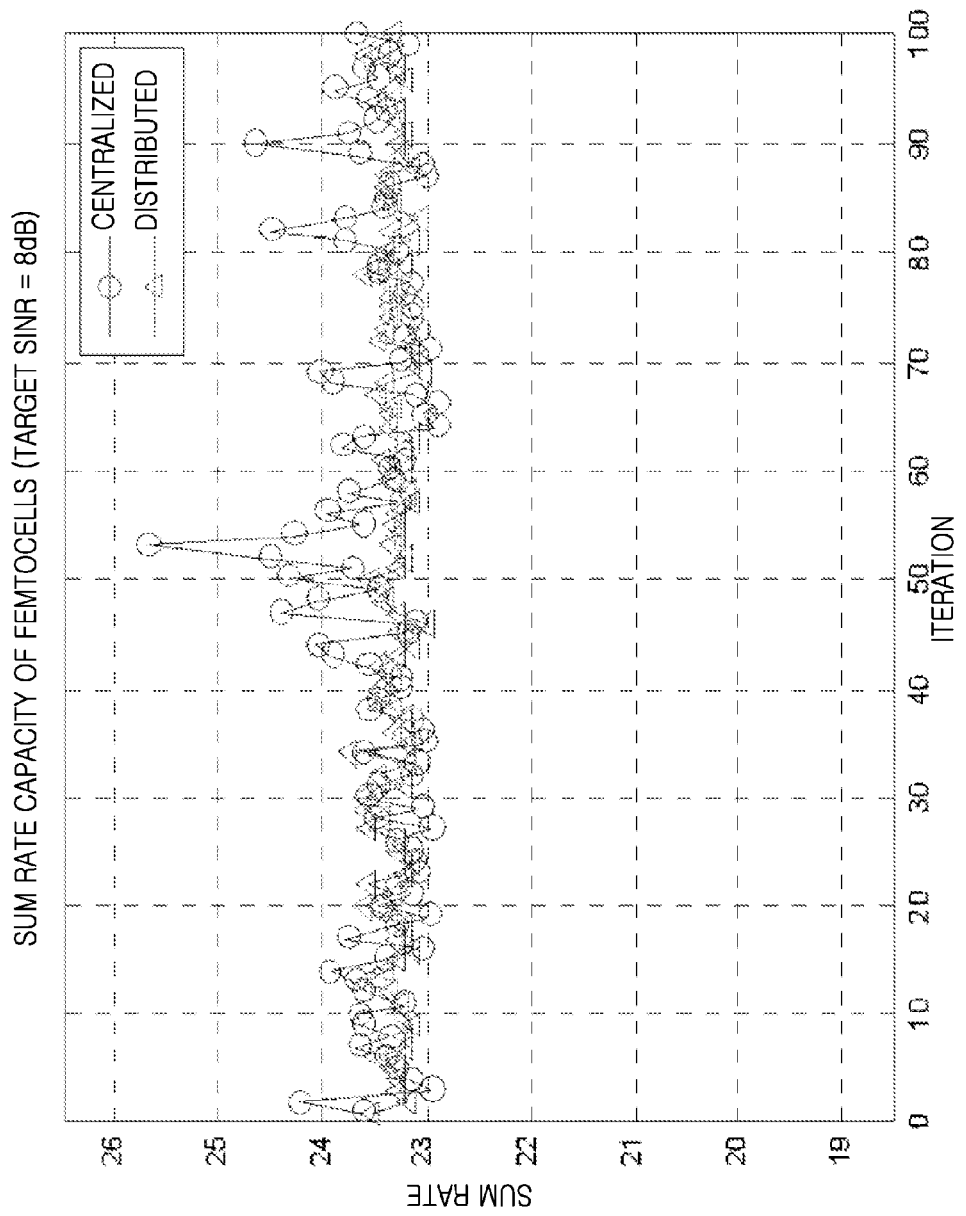
FIG. 11B is a graph illustrating data processing depending on a target SINR when a distance between a femto cell and a femto terminal is 10 m according to an exemplary embodiment of the present invention.
Figure 11C:
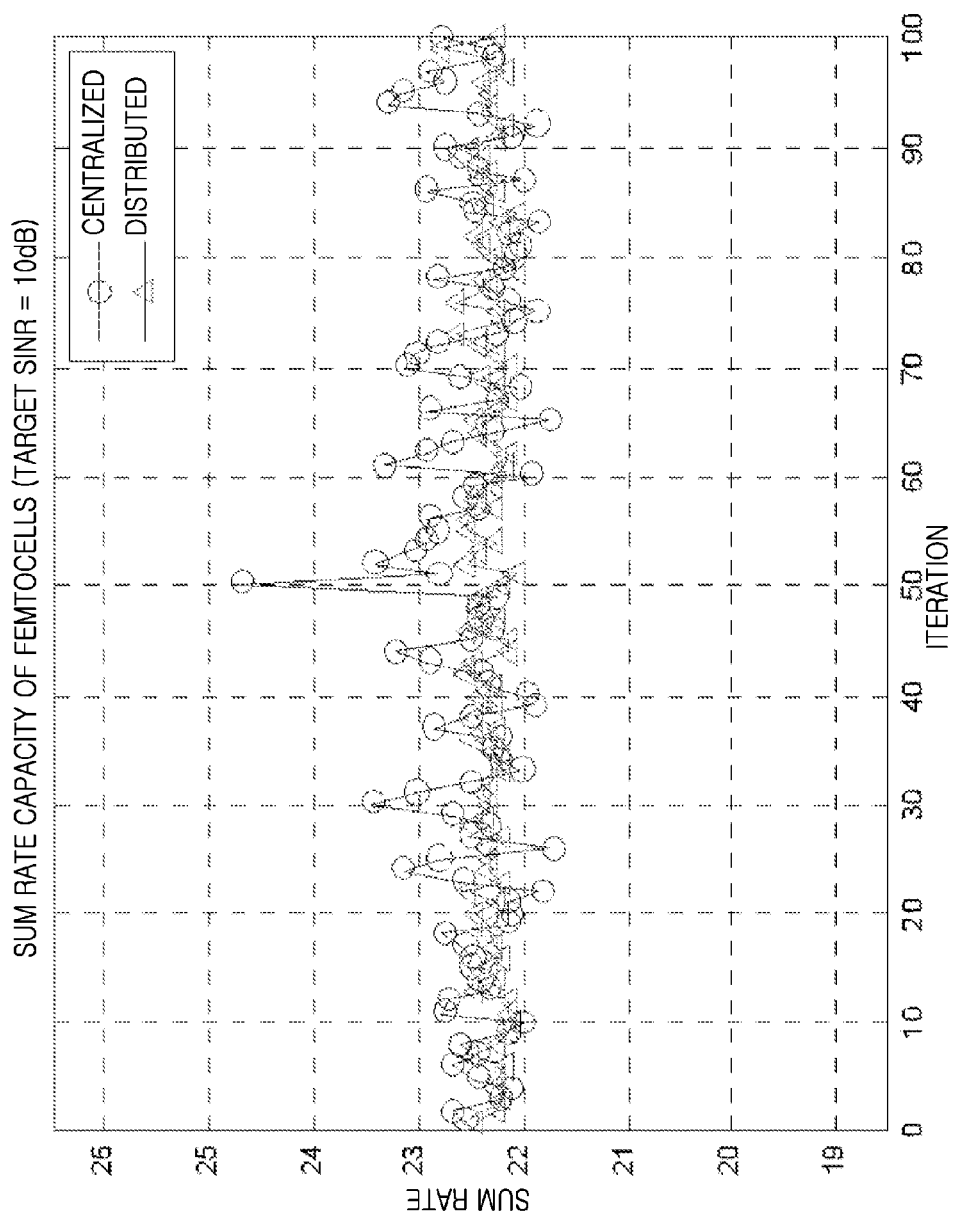
FIG. 11C is a graph illustrating data processing depending on a target SINR when a distance between a femto cell and a femto terminal is 10 m according to an exemplary embodiment of the present invention.

FIGS. 10A through 10C are graphs illustrating data processing depending on a target SINR when a distance between a femto cell and a femto terminal is 5 m according to exemplary embodiments of the present invention, and FIGS. 11A through 11C are graphs illustrating data processing depending on a target SINR when a distance between a femto cell and a femto terminal is 10 m according to exemplary embodiments of the present invention.

Referring to FIGS. 10A through 11C, as a target SINR value increases, the gain reduces. When the target SINR value is high, QoS is difficult to meet, which results in reduction of an interference allowance value allowed to a femto cell by a macro base station as well as power that can be allocated by each femto cell.

In addition, when a distance between a femto base station and a femto cell user is close, a power loss of a signal depending on the distance gets small. Accordingly, a channel gain inside each femto cell as well as the cell gain increases.

In addition, among the self configuring technique and the self optimizing technique, the self optimizing technique sufficiently follows the performance of the self configuring technique. In addition, uncertainty due to short-term fading and Gaussian noise generates an outage. The present simulation has used a technique of compensating for the outage by adding an alpha value to a target SINR in order to obtain a desired SINR.

TABLE 1

| | 5 m | | 10 m | |
|---|---|---|---|---|
| | Central Detecting | Local Detecting | Central Detecting | Local Detecting |
| 6 dB | 1.960 | 1.800 | 1.740 | 1.780 |
| 8 dB | 1.740 | 1.600 | 1.740 | 1.600 |
| 10 dB | 1.600 | 1.490 | 1.590 | 1.495 |

As shown in Table 1, the self optimizing technique has a smaller alpha value than the self configuring technique, which shows that the self optimizing technique is accurate compared to the self configuring technique and so properly meets an outage probability.

Since exemplary embodiments of the present invention set an interference allowance value per femto cell based on a large-scale channel information to limit an aggregate interference given to a macro cell by a plurality of femto cell uplink signals, an overhead of a macro base station is minimized and high QoS of an uplink signal of a macro cell user may be provided.

In addition, since a femto cell user not actively operating inside a cluster does not generate an interference to a macro cell, an interference allowance value of an operating femto cell is increased when the number of non-operating femto cell users is high, so that femto cell power is efficiently allocated and so a data processing rate may be increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a cluster-based power control at a macro base station in a wireless communication system, the method comprising:
    determining an interference allowance value, comprising transmission power of operating femto cells, based on aggregate interference of the operating femto cells so that a Quality of Service (QoS) of a macro cell user is met, and broadcasting the interference allowance value to the femto cells; and
    updating the interference allowance value with consideration of a channel activity for each femto cell in a cluster,
    wherein the transmission power of the operating femto cells is allocated with consideration of large-scale fading, and
    wherein the interference allowance value is determined per femto cell by multiplying an uplink power of a femto cell user by a power loss equation.

2. The method of claim 1, wherein the same value as the interference allowance value is broadcast to the femto cells.

3. The method of claim 1, wherein the updating of the interference allowance value is independently and dispersively performed on a cluster basis with consideration of a number of actively operating femto cells.

4. The method of claim 1, wherein the interference allowance value is set such that a user Signal-to-Interference-plus-Noise Ratio (SINR) of a macro cell meets a probability that does not meet a target SINR.

5. The method of claim 1, wherein the interference allowance value comprises a value obtained by multiplying uplink power of a femto cell user and a power loss equation depending on a distance between the femto cell user and the macro base station.

6. The method of claim 1, wherein the updating of the interference allowance value comprises:
    obtaining a number of actively operating femto cells inside the cluster; and
    determining an interference allowance value per femto cell by applying the number of actively operating femto cells to an outage probability.

7. A method for a cluster-based power control at a femto base station in a wireless communication system, the method comprising:
    receiving an interference allowance value, comprising transmission power of operating femto cells, based on aggregate interference of the operating femto cells so that a Quality of Service (QoS) of a macro cell user is met, from a macro base station;
    allocating power to a terminal with consideration of a path loss in a range of the interference allowance value received based on position information of the femto base station; and
    updating the interference allowance value with consideration of a channel activity for each femto cell in a cluster,
    wherein the transmission power of the operating femto cells is allocated with consideration of large-scale fading, and
    wherein the interference allowance value is determined per femto cell by multiplying an uplink power of a femto cell user by a power loss equation.

8. The method of claim 7, wherein the same value as the interference allowance value is broadcast to the femto cells.

9. The method of claim 7, wherein the updating of the interference allowance value is independently and dispersively performed on a cluster basis with consideration of a number of actively operating femto cells.

10. The method of claim 7, wherein the interference allowance value is set such that a user Signal-to-Interference-plus-Noise Ratio (SINR) of a macro cell meets a probability that does not meet a target SINR.

11. The method of claim 7, wherein the interference allowance value comprises a value obtained by multiplying uplink power of a femto cell user and a power loss equation depending on a distance between the femto base station and the femto cell user.

12. The method of claim 7, wherein the updating of the interference allowance value comprises:
determining a ratio of actively operating femto cells; and
dividing the interference allowance value by the ratio of the femto cells and a power loss value depending on a distance from a macro cell to a femto cell.

13. An apparatus of a macro base station for performing a cluster-based power control in a wireless communication system, the apparatus comprising:
a backhaul communication unit configured to communicate with a different node; and
a controller configured to determine an interference allowance value, comprising transmission power of operating femto cells, based on aggregate interference of the operating femto cells so that a Quality of Service (QoS) of a macro cell user is met, to broadcast the interference allowance value to the femto cells, and to update the interference allowance value with consideration of a channel activity for each femto cell in a cluster,
wherein the transmission power of the operating femto cells is allocated with consideration of large-scale fading, and
wherein the interference allowance value is determined per femto cell by multiplying an uplink power of a femto cell user by a power loss equation.

14. The apparatus of claim 13, wherein the same value as the interference allowance value is broadcast to the femto cells.

15. The apparatus of claim 13, wherein when updating the interference allowance value, the controller independently and dispersively performs the updating on a cluster basis with consideration of a number of actively operating femto cells.

16. The apparatus of claim 13, wherein the interference allowance value is set such that a user Signal-to-Interference-plus-Noise Ratio (SINR) of a macro cell meets a probability that does not meet a target SINR.

17. The apparatus of claim 13, wherein the interference allowance value comprises a value obtained by multiplying uplink power of a femto cell user and a power loss equation depending on a distance between the femto cell user and the macro base station.

18. The apparatus of claim 13, wherein when updating the interference allowance value, the controller obtains the number of actively operating femto cells inside the cluster, and determines an interference allowance value per femto cell by applying the number of actively operating femto cells to an outage probability.

19. An apparatus of a femto base station for performing a cluster-based power control in a wireless communication system, the apparatus comprising:
a backhaul communication unit configured to communicate with a different node; and
a controller configured to receive an interference allowance value, comprising transmission power of operating femto cells, based on aggregate interference of the operating femto cells so that a Quality of Service (QoS) of a macro cell user is met, via the backhaul communication unit from a macro base station, to allocate power to a terminal with consideration of a path loss in a range of an interference allowance value received based on position information of the femto base station, and to update the interference allowance value with consideration of a channel activity for each femto cell in a cluster,
wherein the transmission power of the operating femto cells is allocated with consideration of large-scale fading, and
wherein the interference allowance value is determined per femto cell by multiplying an uplink power of a femto cell user by a power loss equation.

20. The apparatus of claim 19, wherein the same value as the interference allowance value is broadcast to the femto cells.

21. The apparatus of claim 19, wherein when updating the interference allowance value, the controller independently and dispersively performs the updating on a cluster basis with consideration of a number of actively operating femto cells.

22. The apparatus of claim 19, wherein the interference allowance value is set such that a user Signal-to-Interference-plus-Noise Ratio (SINR) of a macro cell meets a probability that does not meet a target SINR.

23. The apparatus of claim 19, wherein the interference allowance value comprises a value obtained by multiplying uplink power of a femto cell user and a power loss equation depending on a distance between the femto base station and the femto cell user.

24. The apparatus of claim 19, wherein when updating the interference allowance value, the controller determines a ratio of actively operating femto cells, and divides the interference allowance value by the ratio of the femto cells and a power loss value depending on a distance from a macro cell to a femto cell.

* * * * *